United States Patent [19]

Lanham et al.

[11] Patent Number: 4,631,029
[45] Date of Patent: Dec. 23, 1986

[54] BAKING OVEN WITH HEATED AIR DISTRIBUTION-II

[75] Inventors: William E. Lanham, Conyers; Stephen R. Smith, Tucker, both of Ga.

[73] Assignee: Lanham Machinery Company, Inc., Atlanta, Ga.

[21] Appl. No.: 780,967

[22] Filed: Sep. 25, 1985

Related U.S. Application Data

[63] Continuation-in-part of Ser. No. 559,892, Dec. 9, 1983, Pat. No. 4,544,352.

[51] Int. Cl.$^4$ .............................................. F27B 9/00
[52] U.S. Cl. .................................. 432/133; 432/176; 432/199; 34/207; 126/21 A; 99/443 C
[58] Field of Search ............. 126/21 R, 21 A; 99/447, 99/443 C; 432/176, 133, 199; 34/207, 208, 236, 196, 203

[56] References Cited

U.S. PATENT DOCUMENTS

| | | | |
|---|---|---|---|
| 798,345 | 8/1905 | Johnson | 34/207 |
| 2,573,217 | 10/1951 | Parmelee | 34/207 |
| 3,589,307 | 6/1971 | Lanham | 432/49 |

Primary Examiner—James C. Yeung
Attorney, Agent, or Firm—Pasquale A. Razzano

[57] ABSTRACT

A bakery oven, of the type employing a continuous spiral conveyor for carrying goods to be baked through an oven enclosure, employs an air distribution system to direct heated air from near the top wall of the oven enclosure to a plenum chamber, and from there through an air distribution network to at least certain ones of the tiers of the spiral conveyor. Preferably, heater elements are disposed beneath alternate ones of the tiers of the conveyor system within the oven enclosure, while the air distribution pipes are disposed beneath the remaining tiers. This arrangement serves to decrease fuel consumption for the burners, thereby increasing productivity, and further serves to decrease the stratification of heat layers within the oven enclosure, thereby providing uniform baking conditions throughout the oven enclosure.

6 Claims, 4 Drawing Figures

BAKING OVEN WITH HEATED AIR DISTRIBUTION-II

This application is a continuation-in-part of U.S. patent application Ser. No. 559,892, filed Dec. 9, 1983, now U.S. Pat. No. 4,544,352.

The present invention relates to ovens and, more particularly, is directed to ovens for bakery products which are conveyed continuously through an oven's insulated enclosure on an endless spiral conveyor. More specifically, the invention is directed to such a baking oven incorporating an air distribution system which directs heated air to predetermined places within the oven enclosure to create a more uniform baking pattern by decreasing the stratification of heat within the oven enclosure. As a result, energy requirements for the oven are reduced.

Ovens that incorporate spiral oven conveyor systems have been previously proposed, for example, in U.S. Pat. No. 3,478,705. With such a spiral conveyor system, a series of uncooked bakery goods are brought into the oven and are carried all along the same path through the oven. With this arrangement, the bakery goods are exposed to exactly the same baking conditions, so that each item receives the same degree and character of baking. This leads to uniform baking of baked goods. The baked goods can be of any type produced in a bakery, such as breads, rolls, cookies, cakes, pies, pastries, and the like.

The same conveyor system can further be used for proofing raw dough prior to baking, and has the advantage that each item receives the same amount of proofing; accordingly, each loaf of bread, for example, rises by the same amount prior to baking.

In order to provide still more uniform baking of the bread, rolls, or other baked goods in the oven, it has been also proposed, for example, in U.S. Pat. No. 3,589,307, to arrange the spiral conveyor within the oven in successive tiers, and to place individually-controllable burner elements generally parallel to and beneath alternate ones of these conveyor tiers. This results in a controlled, substantially uniform temperature throughout the oven enclosure, so that the baked goods receive more-or-less even baking over their entire passage along the spiral conveyor through the oven.

However, it has been discovered that even with these previously proposed improvements, there is a substantial amount of heat stratification within the oven, so that the loaves of bread or other bakery goods being conveyed on the upper conveyor tiers are subjected to more intense heat than those on the lower tiers. It is much simpler to control the texture, crust thickness, and other qualities of the baked goods if it is possible to decrease, or to minimize the heat stratification within the oven. Further, the stratification of heat involves wastage of heat, and requires substantially more fuel to heat the oven to insure that the lower tiers of the conveyor are at sufficiently baking temperatures.

Accordingly, it is an object of the present invention to provide an improved oven for bakery products which avoids the drawbacks of the prior art.

It is a further object of the invention to provide an oven construction for baking bread, rolls, or other bakery goods, in which the bakery goods are subjected to substantially uniform baking conditions throughout their journey through the oven.

It is still a further object of the invention to provide a bakery oven, of the type having a spiral conveyor, and in which air distribution means are incorporated to distribute the heated air throughout the oven in a manner both to decrease fuel consumption for the oven burners and also to minimize stratification of heat within the oven.

According to a significant aspect of this invention, a baking oven has an oven enclosure including a floor, sides, a front wall, a back wall, and a top wall. A spiral conveyor has an ingress conveyor section for carrying the bakery goods to be baked into the enclosure, a first conveyor tier within the oven enclosure leading from the ingress conveyor section, and a plurality of further conveyor tiers disposed within the oven enclosure, serially one above the next, with an egress conveyor section carrying the baked goods from the last of the conveyor tiers out of the oven enclosure. A heater or heaters (typically gas burners) within the oven enclosure heat the air within the enclosure for baking the goods that are being carried on the tiers of the conveyor. In order to ensure even heat distribution within the oven enclosure, by minimizing stratification of heat within the oven enclosure, an air distribution system takes the heated air from near the top wall of the oven enclosure, and distributes the air, through a plenum chamber and thence through a piping conduit network, beneath at least selected ones of the conveyor tiers. This arrangement has the further benefit of also minimizing the amount of fuel required for the heater or heaters, because it significantly reduces wastage of heat.

In several preferred embodiments of this invention, the heaters for the oven include a plurality of heating elements disposed within the oven enclosure, and these are located generally parallel to and disposed beneath alternate ones of the tiers of the spiral conveyor. In such case, the piping conduit network includes a plurality of air distribution pipes within the oven enclosure, including distribution sections extending generally parallel to at least certain ones of the others of the tiers of the spiral conveyor and discharge sections extending below and perpendicular to such conveyor tiers.

The above and other objects, features, and advantages of this invention will be more fully understood from the ensuing detailed description of a preferred embodiment, when considered in connection with the accompanying drawings, in which.

Figure 1:
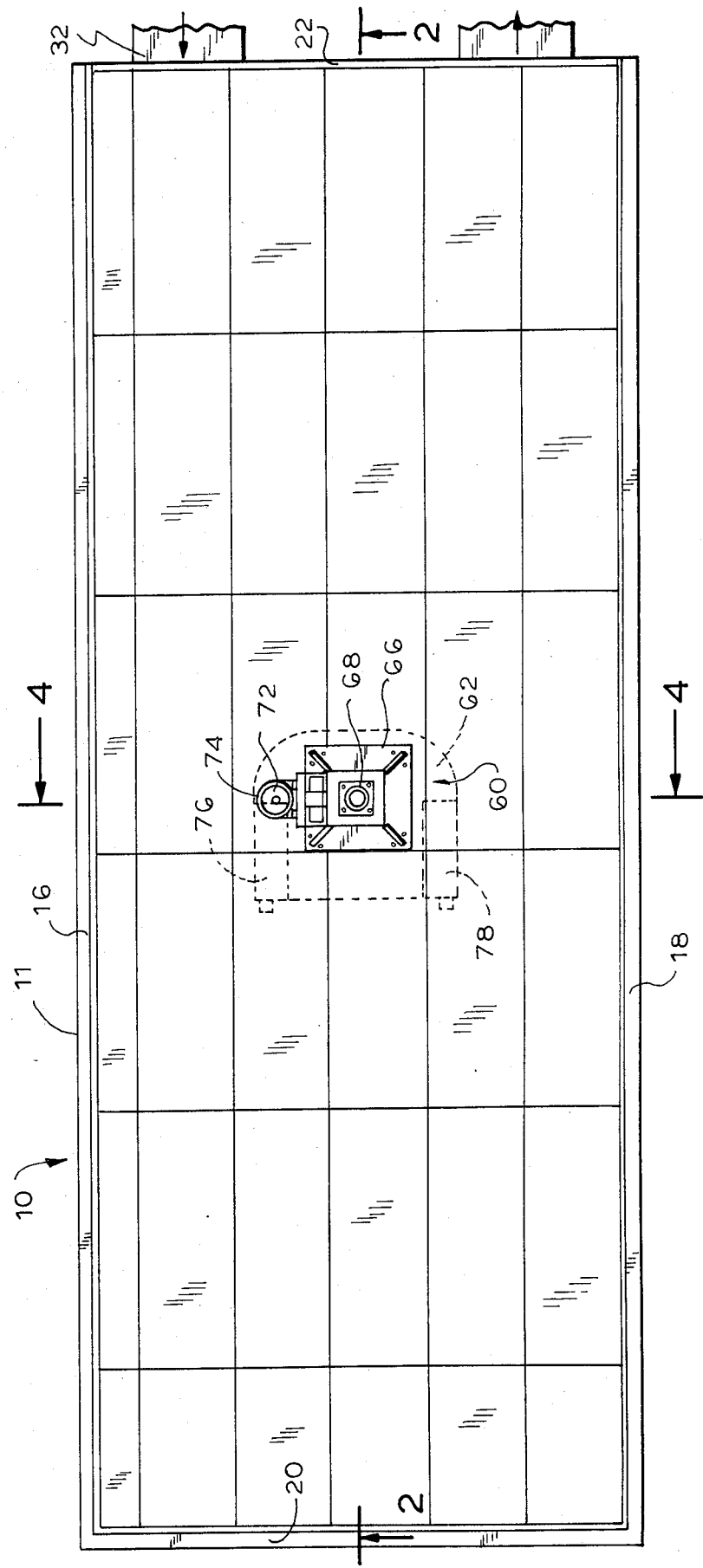
FIG. 1 is a plan view of a baking oven according to an embodiment of this invention.
Figure 2:
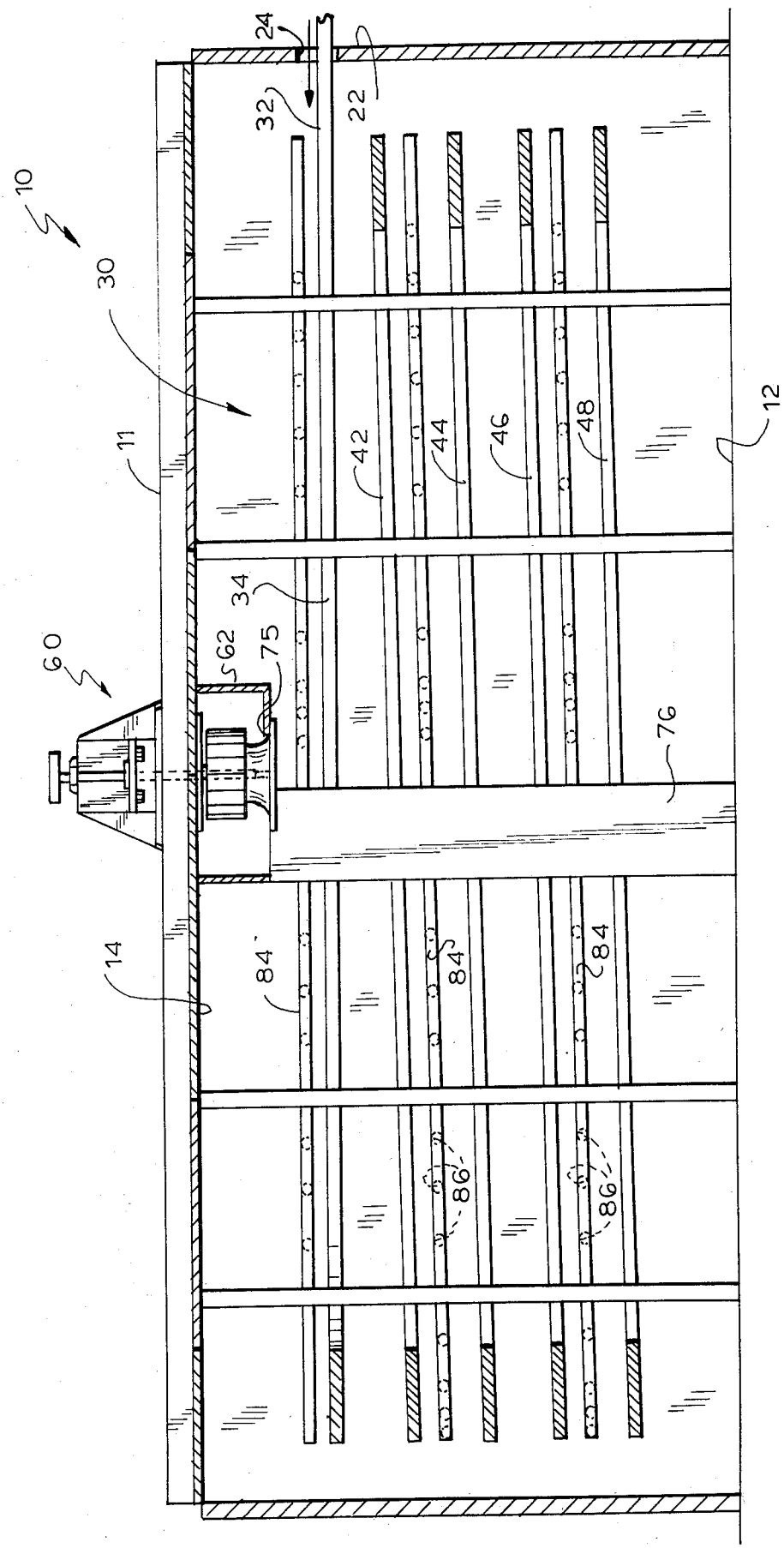
FIG. 2 is a sectional elevation of the embodiment of FIG. 1, taken generally along line 2—2 of FIG. 1.

Referring now to the drawings in detail, and initially to FIGS. 1 and 2, a baking oven 10 includes an enclosure 11 constructed generally in the form of a rectangular parallelepiped having a floor 12, a top wall 14, side walls 16 and 18, and end walls 20 and 22. The latter can be considered to be the front and the back of the oven.

Openings 24, 26 are formed in front wall 22 which define inlet and outlet points, respectively, through which dough to be baked is conveyed into and baked goods conveyed out of the oven enclosure.

Enclosure walls 14, 16, 18, 20 and 22 are preferably well insulated with a suitable insulating material. Such walls can be generally of the construction disclosed in U.S. Pat. No. 3,589,307, mentioned previously.

In order to carry the bakery products along a path through oven 10, a spiral conveyor system 30 is provided which can be of the type disclosed, for example, in U.S. Pat. No. 3,478,705, the disclosure of which, for the sake of brevity, is incorporated herein by reference. Accordingly, only the essence of the operation and construction of the spiral conveyor system 30 is discussed here.

Conveyor system 30 carries the bakery goods along a more-or-less spiral path within oven 10, so that each bakery good, that is, each loaf of bread, or each roll, cake, or cookie, traverses exactly the same path within the oven, so that all receive the same amount and same degree of baking.

Unbaked goods enter on an ingress conveyor section 32 through port 24, and this section 32 becomes one side of a first conveyor tier 34. The bakery goods are then conveyed around a curved end 36 of the first tier to the other side 38 of the first tier, whence they are conveyed around another curved end 40, to a second tier 42 of similar construction. The bakery goods are conveyed in like manner to a third tier 44, a fourth tier 46, a fifth tier 48, etc. and thence to an egress conveyor section 52 on which baked goods leave the oven through the conveyor port 26.

It is noted that although a specific spiral conveyor configuration has been disclosed, other known conveyor configurations can be used in conjunction with the present invention, e.g., systems where the baking products enter and leave the enclosure at the same level, or at different sides.

Heating elements 54 for the oven are distributed, for example, in side by side fashion beneath alternate tiers. In the embodiment shown in FIG. 4 these heating elements are gas burners, and are arranged in generally parallel pairs along and beneath alternate tiers and generally equidistant on either side of the conveyor centerline.

This arrangement is also discussed in U.S. Pat. No. 3,589,307. Preferably, heating elements 54 are individually controlled, so that the bakery goods receive controlled even, substantially uniform heating throughout all sections of the oven.

While these heating elements are shown to be parallel to each other and to the conveyor, other arrangements and positions therefor can be used with the invention, as would occur to those skilled in the art.

A special feature of the oven 10 of this embodiment is the air distribution system 60. In this system 60, a hot air recovery plenum 62 is mounted within and at the top of the enclosure 11. A fan 64 of conventional construction includes a turbine rotor system, rotatably mounted within plenum 62 in any convenient manner. The turbine includes a drive shaft 65 which extends upwardly, out of the enclosure where it is supported for rotation within a frame 66 mounted on top of the enclosure. A pulley 68 is fixed on the free end of shaft 65 and is driven through a belt 70 engaged with a pulley 72 secured to the drive shaft of a motor 74 mounted on frame 66.

Figure 3:
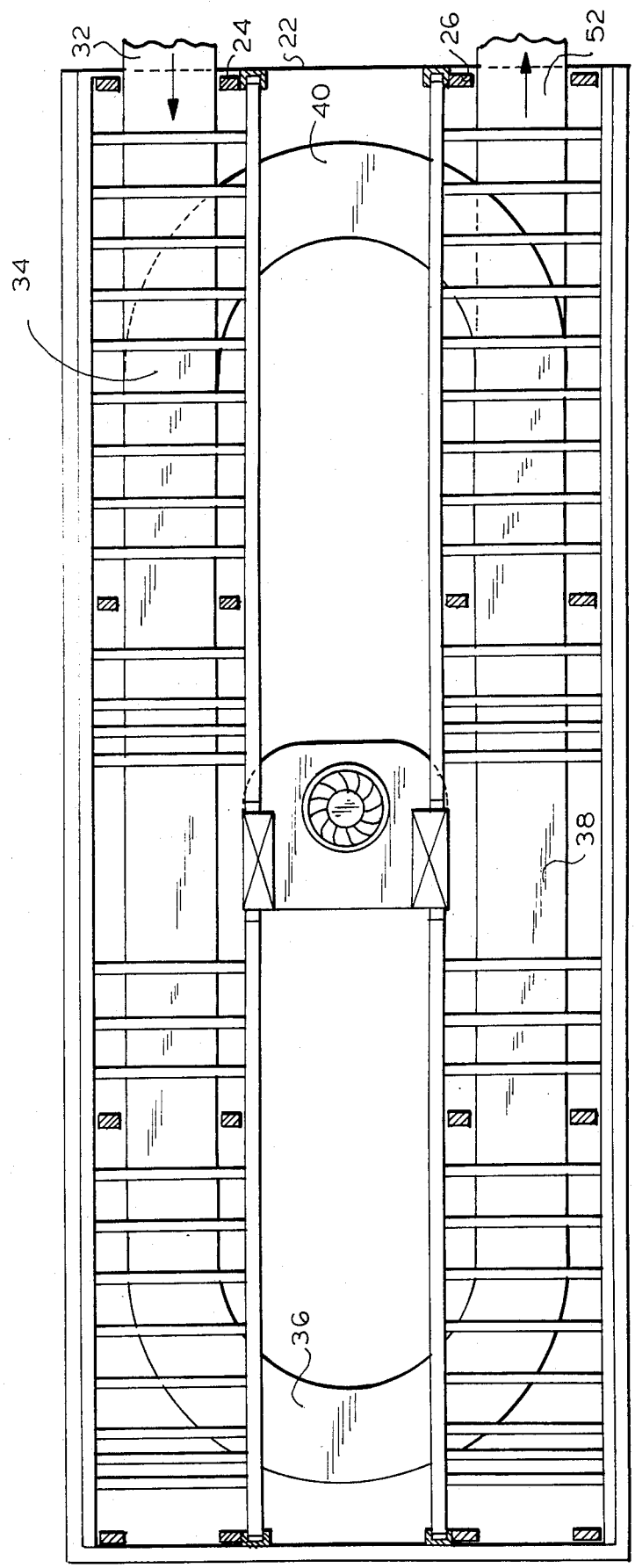
FIG. 3 is a sectional view, taken along line 4—4 of FIG. 2.

Operation of motor 74 during baking causes the turbine or fan 64 to rotate within plenum 62 and draw air from the top of the enclosure through the center of the fan, as indicated by arrows A in FIG. 3. In this regard, as seen in FIGS. 2 and 3, plenum 62 has an opening 75 formed therein in alignment with fan 64 to permit air to enter the fan and to be discharged thereby, under pressure, into plenum 62.

Figure 4:
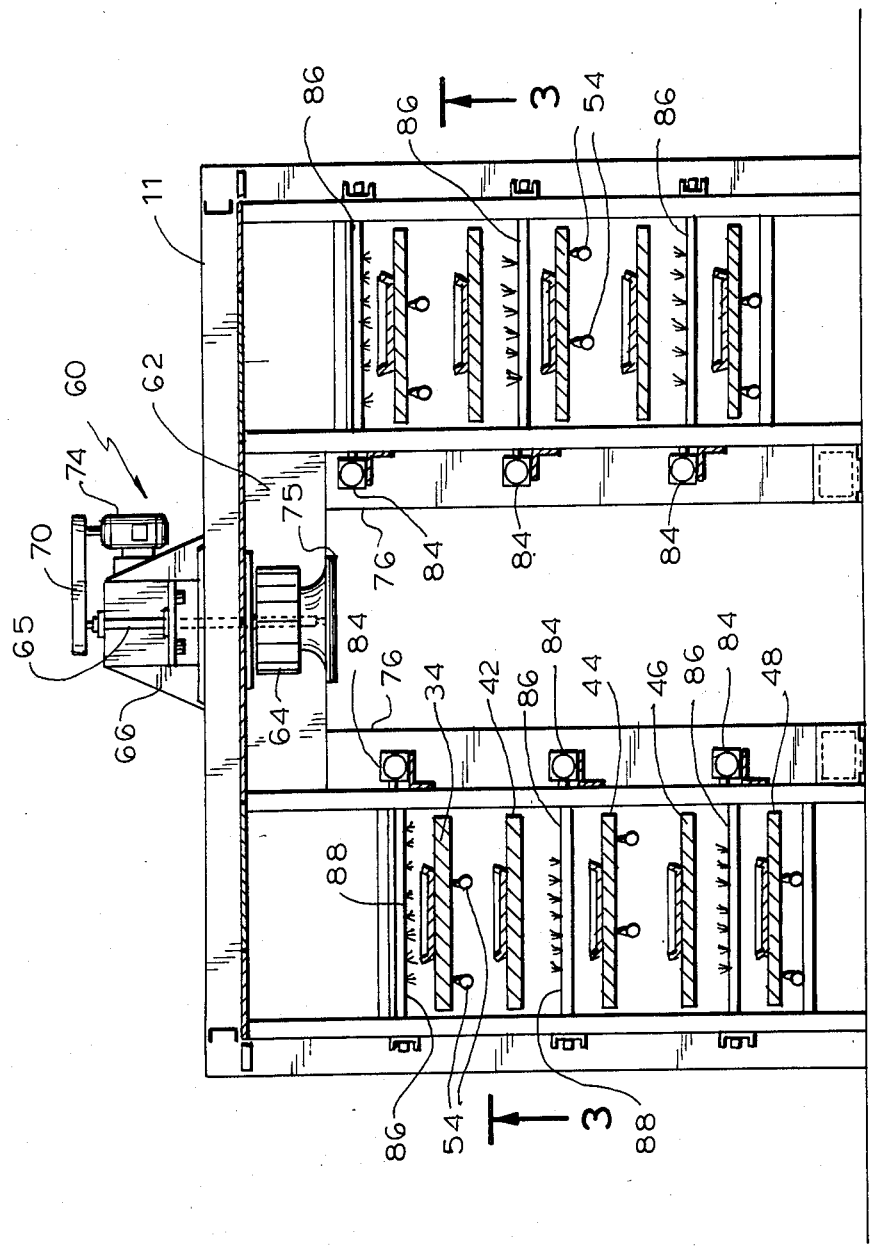
FIG. 4 is a sectional view, taken along line 4—4 of FIG. 1, diagrammatically showing the arrangement of air distribution pipes within the oven enclosure.

A pair of vertically extending auxiliary distribution plenums or ducts 76, 78 are mounted within oven 10, inside the spiral formed by the conveyor, as seen in FIGS. 3 and 4. These plenums communicate with plenum 62 and receive the hot air drawn therein by the fan.

The bottoms of auxiliary plenums 76, 78 are closed and these plenums serve to redistribute the hot air from the top of the enclosure to predetermined locations along the path of travel of the conveyor, at lower levels in the oven. To this end, a plurality of distribution pipes or manifolds 84 are connected to and extend generally laterally outward from plenums 76, 78 towards the end walls 20, 22 of the oven enclosure, generally parallel to selected tiers of this conveyor.

As seen in FIG. 4, each pipe 84 has a plurality of air discharge pipes 86 connected to it and extending generally perpendicularly therefrom. These discharge pipes have openings or nozzles 88 formed therein to allow the hot air recirculated by fan 64 through plenums 76, 78 and pipes 84 to be discharged in predetermined areas of the oven between selected conveyor flights or tiers. Additionally, the discharge pipes 86 are rotatably mounted, in any convenient manner, on manifolds 84 for rotation about their long axes, to permit the openings or nozzles 88 to be positioned upwardly, downwardly, or in any intermediate position, thereby to allow the operator to accurately control heat intensity at various locations within the oven to assure uniform baking.

As seen in FIG. 4, pipes 86 are disposed beneath alternate conveyor flights while heating elements 54 are disposed beneath the other alternate conveyor tiers.

It should be understood that this invention is not limited to the precise embodiment disclosed hereinabove. For example, the spiral path which the bread or other bakery goods follow through the oven enclosure can extend either from the top tier to the bottom tier of the oven enclosure 11, or can alternatively extend from the bottom tier to the top tier. Moreover, while the heating elements 54 and the air distribution pipes 86 are disposed between alternate ones of the tiers of the conveyor system, it is also possible, following the principles of this invention, that only selected ones of the tiers have the heating elements disposed beneath them, and that only certain others of the remaining tiers have the air distribution pipes disposed therebeneath.

It should be apparent that with ovens constructed according to the principles of this invention, a more uniform baking heat is provided throughout the entire oven enclosure 10. Furthermore, it should be apparent that heat, in the form of heated air which might otherwise either be trapped at the top of the oven or escape through cracks or other openings near the top wall 14 of the oven, is captured and recycled downwards through the oven. Thus, heat is used which might otherwise be lost or wasted, saving energy costs.

There is a complete elimination of oven flash heat with the arrangement of this invention; consequently, the products have uniform color from the beginning to the end of a product run. This eliminates the operator's concern about adjusting the burner control for breaks in production of the baked products. Hence, the improvement of this invention yields substantially enhanced burner efficiency.

Furthermore, the recycled heated air fed from the pipes 86 does not produce any additional weight loss or drying of the baked product. That is, the product does not "dry out" because of hot air blowing onto the product surface. This favorable property has been discovered empirically by operating an oven system constructed according to this invention.

Of course, while one embodiment of this invention has been described in detail hereinabove, it should be apparent that many modifications and variations thereof would present themselves to persons of ordinary skill in the art without departing from the scope and spirit of this invention.

We claim:

1. A baking oven comprising an oven enclosure; a generally spiral conveyor within said enclosure including an ingress conveyor section for carrying bakery goods to be baked into said enclosure, a first conveyor tier leading from said ingress conveyor section, a plurality of further conveyor tiers serially arranged with respect to each other, and an egress conveyor section carrying baked bakery goods from a final one of said conveyor tiers out of said oven enclosure; heating means within said oven enclosure means for heating the air therewithin for baking the bakery goods being carried on said conveyor tiers in said oven enclosure; and air distribution means for taking heated air from near the top of said oven enclosure and distributing the heated air, through a piping conduit network, between at least selected ones of said conveyor tiers, to provide generally uniform heat distribution with said oven enclosure and minimize stratification of heat therein; said piping conduit network including a plurality of air distribution manifolds within said oven enclosure and extending generally parallel to selected conveyor tiers and a plurality of air distribution pipes connected to and extending generally perpendicular to said manifolds beneath selected conveyor tiers; said heating means including a plurality of heating elements disposed within said oven enclosure and disposed beneath selected ones of the tiers of said spiral conveyor; and said heating elements being disposed beneath alternate ones of said conveyor tiers, while said air distribution pipes are disposed beneath the remaining ones of said conveyor tiers.

2. A baking oven according to claim 1, wherein said spiral conveyor defines a central open area within said oven enclosure; and said air distribution means includes a plenum chamber within said central open area, fan means within said plenum for drawing heated air from the top of the enclosure into said plenum chamber, and a pair of auxiliary plenums extending downwardly from said plenum chamber within the spiral conveyor; said air distribution manifolds extending from said auxiliary plenum chambers.

3. A baking oven according to claim 2, wherein said fan means includes a turbine located within said plenum chamber and having a central open mouth opening through the plenum chamber to the interior of the enclosure.

4. A baking oven comprising an oven enclosure, a generally spiral conveyor within said enclosure including an ingress conveyor section for carrying bakery goods to be baked into said enclosure, a first conveyor tier extending from said ingress conveyor section, a plurality of further conveyor tiers serially arranged with respect to each other, and an egress conveyor section for carrying baked bakery goods from a final one of said conveyor tiers out of said oven enclosure; heating means within said oven enclosure for baking the bakery goods being carried on said conveyor tiers; and air distribution means for taking heated air from near the top said oven enclosure and distributing the heated air, through a piping conduit network, between at least selected ones of said conveyor tiers, to provide generally uniform heat distribution within said oven enclosure and minimize stratification of heat with said enclosure; said spiral conveyor defining a central open area within said oven enclosure means; and said air distribution means including a plenum chamber located within said enclosure in said central open area, fan means in said plenum chamber within said enclosure for drawing heated air from the top of the enclosure into said plenum chamber; and a pair of auxiliary plenums communicating with and extending downwardly from said plenum chamber within the spiral conveyor to receive hot air therefrom; said piping conduit network communicating with said auxiliary plenums to receive hot air therefrom; and said plenum chamber having an opening therein and said fan means including a turbine having a central mouth disposed in alignment with said opening to draw hot air therethrough.

5. A baking oven according to claim 4, wherein said piping conduit network includes a plurality of air distribution manifolds within said oven enclosure and extending generally parallel to selected conveyor tiers and a plurality of air distribution pipes connected to and extending generally perpendicular to said manifolds beneath selected conveyor tiers.

6. A baking oven according to claim 5, wherein said air distribution pipes have air discharge openings formed therein and are rotatably mounted to permit adjustment of the direction of air discharge therefrom.

* * * * *